3,330,133
GAS CONTROL MECHANISM
Duane V. Kniebes, La Grange, Ill., assignor to Institute of Gas Technology, a corporation of Illinois
Filed Dec. 20, 1965, Ser. No. 515,111
1 Claim. (Cl. 67—119)

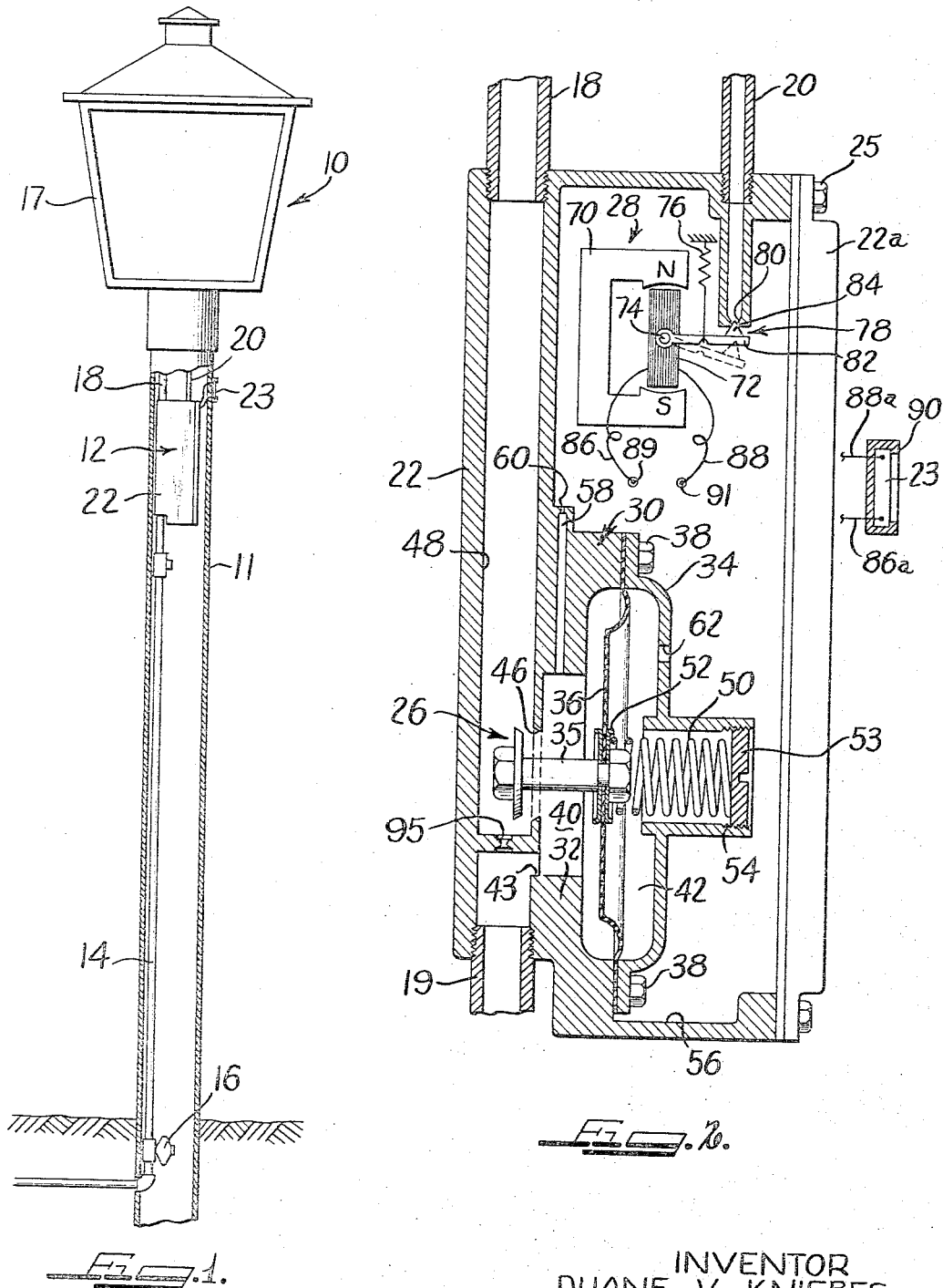

This invention relates to gas control mechanism and, more particularly, to an automatic gas control mechanism for turning down a gas light during daylight hours and for turning up the gas light at night.

Gas lights are being utilized in a number of suburban communities because of the considerable charm which they add to the homes in the community. Use today is limited because of the relatively high operational costs of the gas light in certain areas of the country and because of the relatively high cost of prior gas control mechanisms for automatically controlling the flow of gas. Further, most prior gas control mechanisms have required a separate source of electrical power to actuate the control in the gas control mechanism. Among the design criteria for an improved gas light are completely automatic operation, provision of a compact gas control mechanism within the gas light pole, such mechanism having a self-contained source of electrical power for actuating a control therein, and simplicity of design so that the gas control mechanism will be reliable in operation and relatively free of maintenance. It is desired that the components of the gas control mechanism be constructed and arranged so as to be positive in action and to minimize electrical power requirements.

An object of the present invention is to provide an improved automatic gas control mechanism for gas lights which is compact and requires less energy for operating the control therein.

Another object of this invention is to provide an automatic gas control mechanism which is relatively simple in design, stable in operation and which includes a pressure-responsive valve and a control therefor operated automatically in response to the environmental light sensed by a solar battery. These and other objects of the present invention will become more apparent hereinafter.

The novel structural components and their mode of functioning will be made most manifest and particularly pointed out in clear, concise and exact terms in conjunction with the accompanying drawing, wherein:

FIG. 1 is an elevational view of a gas light, partly in section, embodying the improved gas control mechanism of the present invention; and FIG. 2 is an enlarged cross-sectional view of the gas control mechanism of the present invention.

Referring to FIG. 1, there is shown a gas light 10 having affixed in the tubular support 11 thereof the gas control mechanism 12 of the present invention. The gas light control of this invention is an improvement over that shown and claimed in my earlier patent, No. 3,188,836, granted June 15, 1965. Gas is supplied to the gas light 10 from a suitable source via conduit means 14. The gas is maintained at a relatively constant pressure by regulator 16 in conduit means or line 14. Regulator 16, which may be mounted in the bottom of the support 11 or at a remote location, may be a conventional diaphragm-type pressure regulator.

Gas passes through line 14 to the gas control mechanism 12 and then to the gas lamp or light in the head 17 via conduit means or line 18 and pilot line or tube 20. The gas control mechanism 12 comprises essentially a pressure-responsive means and a control therefor mounted together in a protective casing or housing 22 that is suitably supported in support or post 11.

The control for the gas control mechanism 12 includes a self-contained electrical power source, photoelectric means 23, which is preferably a sun-battery or solar cell.

Pilot line 20 communicates the interior of enclosure 22 with the gas light in head 17 and may be adapted to provide a pilot light within the gas light head 17.

Referring now to FIG. 2, there is disclosed an enlarged cross-sectional view of the improved gas control mechanism 12. The mechanism 12 includes a housing or enclosure 22 having a chamber therein closed by a cover 22a that is joined to the enclosure by fastening means 25. Provided in the enclosure is a gas inlet which connects with inlet connection 19 that is in turn joined to conduit 14, a gas outlet which communicates with line 18, and a pilot outlet which communicates with line 20. Within housing 22 are a pressure-responsive valve 26 and a control which includes galvanometer 28. The housing means 30 of the pressure regulator for actuating valve 26 is defined in part by a formed wall portion 32 of the housing 22 and a cover member 34, between which is connected a flexible diaphragm 36. The members 32 and 34, respectively, are connected by suitable fastening means, as for example, screws 38. The flexible diaphragm 36 divides the interior of the regulator housing 30 into a first chamber 40 and a second chamber 42 and is connected to valve 26 by means of valve stem 35.

Provided in the wall member 32 defining a part of housing 30 is an inlet 43 which communicates with the conduit 14 via inlet connection 19. The valve seat 46 is defined in wall member 32. Valve means 26 are provided for controlling the flow of gas from the chamber 40 in the pressure regulator to the pasage 48 in housing 22 that communicates with line 18.

Means are provided in the pressure regulator housing 30 for biasing the valve 26 to the open position. Such means preferably comprise a coil spring 50 provided in the second chamber 42 in housing 30 and adapted to operate between the plate 52 secured to the valve stem 35 and diaphragm 36 and the adjustable stop 53 adjacent the top of the cover member 34. The spring tension or compression may be adjusted by rotating threaded stop member 53 in the threaded bore 54 in the housing cover member 34. Obviously, a compression spring may be provided in chamber 42 or a tension spring may be provided in chamber 40.

The chamber 40 in the housing 30 communicates with chamber 56 in enclosure or housing 22 through passage 58 and orifice 60 in passage 58. The chamber 42 in housing 30 communicates with chamber 56 via opening 62 in cover member 34.

The control for varying the pressure in chamber 56 to selectively adjust the pressure-responsive valve 26 includes a conventional galvanometer indicated generally at 28. The galvanometer comprises a permanent magnet 70 fixed within chamber 56 in housing 22. Provided between the pole pieces of the permanent magnet is a pivoted oil 72 rotatably mounted in the housing on shaft 74. Secured to the shaft 74, which is spring biased to a neutral position by spring 76, is a control means 78 for regulating the size of orifice opening 80 defining the entry to pilot conduit 20. Such control means comprises a lever arm 82 fixedly connected to the shaft 74 and a generally conical restriction member 84 adapted to extend into orifice opening 80 to vary the size of the orifice and thereby control the pressure in chamber 56.

Affixed on the tubular support 11 in a position to sense light and dark is a photoelectric means 23, which is electrically connected to the movable coil 72 by means of leads 86, 86a and 88, 88a. Terminals 89, 91 which extend through a wall of housing 22 electrically connect leads 86, 88 with leads 86a, 88a, respectively. Such photoelectric means comprise a solar cell or sun-battery. The term "solar cell" designates a battery comprising one or more photovoltaic cells. Such cells produce at their terminals a predetermined potential responsive to the incidence of light waves. Thus, the photoelectric means 23 provide a self-contained source of electrical power for the gas control mechanism 12.

The photoelectric means 23 are supported on the support or post 11 by means including a shield 90 which reduces interference with solar cell operation because of incidental light from the gas light.

*Operation*

The flow of gas to the gas light from a source of gas (not shown) is automatically regulated by a gas control mechanism 12 comprising a pressure-responsive valve 26 and a control 28. The flow of gas through the housing 22 is controlled by the valve 26 in response to movement of the flexible pressure-responsive diaphragm 36 in regulator housing 30. Regulator 16 maintains a relatively constant gas pressure in the chamber 40. The pressure within the chamber 40 acts upon one side of the flexible diaphragm 36 and urges the valve 26 toward closed position. Acting in an opposite direction on the flexible diaphragm 36 is a coil spring 50, which urges the valve 26 to the open position. By maintaining a relatively constant gas pressure in the chamber 40 and maintaining a relatively constant spring pressure upon the diaphragm exerting a force tending to open the valve, it is possible to control the opening and closing of the valve by adjustment of the gas pressure in the chamber 42. Thus, the purpose of the control including galvanometer 28 is to regulate the gas pressure within the chamber 42 and thus effectively regulate the operation of the valve 26.

Gas is supplied to the chamber 56 at a reduced pressure through the restriction or orifice 60 in the end of passage 58. If orifice 80 were reduced in size, it is evident that the pressure in chambers 56 and 42 would increase. Complete closure of orifice 80 would result in substantially full inlet gas pressure being transmitted to the surface of the flexible diaphragm 36 acted on by spring 50.

Galvanometer lever 72 has a restriction member or valve 84 thereon for reducing the size of orifice 80 by insertion of the restriction member or needle 84 into the orifice opening 80, thereby reducing the rate of gas flow and causing a pressure increase in the chamber 42 of the regulator housing 30. Withdrawal of the needle or restriction member 84 from the orifice opening will cause a pressure reduction in the chamber 42. The spring pressure on the diaphragm 36 may be manually adjusted to a point where the two pressure levels will open and close the valve 26 to control the flow of gas through the chamber 40.

The regulation of the size of orifice 80 is controlled electrically, inasmuch as the control means 78 are constructed and arranged to move with the pivoted coil 72 of the galvanometer 28. The power to operate the galvanometer coil is obtained from the solar battery 23 which generates electrical current upon exposure to light.

When in use on a gas light, the solar battery 23 is shielded from the light of the glowing mantle and from other lights in the vicinity by means of a shield member 90.

At night, the solar battery 23 is de-energized and the control needle 84 is positioned such that the spring return of the galvanometer keeps the needle 84 in the opening of the orifice 80, which results in sufficient pressure in the chamber 42 to keep the valve open, allowing gas flow to the gas light 10.

When sunlight falls on the solar battery, sufficient electrical power is developed to deflect the galvanometer coil 72, thereby causing the control means 78 to move, withdrawing the needle 84 from the orifice 80. Gas pressure can pass from chamber 56 to the pilot flame conduit 20. This causes a pressure reduction in the chamber 42 to the point where the pressure in the chamber 40 overcomes the combined pressure of the gas in the chamber 42 and the pressure of the spring 50, causing the valve 26 to close, and shutting off the flow of main flow of gas to the gas light and turning down the light.

Gas flowing through bypass orifice 95 provides an ignition source or pilot for the gas light when it is turned on again after dark. The use of orifice 95 permits freedom in design of needle 84. The needle 84 may seal orifice 84 or it may be adapted to permit bleed of gas therethrough when needle 84 is engaged within the orifice.

Two of the more important features of this invention are now considered in more detail. One important feature of this invention is the location of the galvanometer arm 82 adjacent the orifice opening 80 in the pilot conduit rather than at the outlet from passage means 58 as in my prior patent, No. 3,188,836. The advantage of the present arrangement is that the conical restriction member or valve member 84 has a more positive open and close action due to an unstable lever arm position when the restriction member 84 is not touching, but is in very close proximity to the orifice opening.

The reason for this condition is that when the restriction member 84 is in the orifice opening 80 (when it is dark and there is no power from the solar cell) the difference in gas pressure between that in chamber 56 and that in pilot conduit 20 tends to hold the restriction member in the orifice opening 80. Therefore, much more energy from the photoelectric means 23 is required to move the restriction member 84 away from the orifice opening 80 than would be required is no gas pressure difference existed. Thus, when enough energy is supplied from the solar cell 23 to pull the restriction member 84 out of the orifice opening 80, it swings well away from opening 80. Therefore, a significant drop in energy is required to bring the restriction member back to the immediate vicinity of the orifice opening where the flowing gas will suck it into position and again hold it firm.

Tests of one form of the present invention show that about 200 foot-candles of daylight falling on solar battery 23 are required to energize the galvanometer 28 to pull the restriction member 84 from the orifice opening 80 and permit valve 26 to move against its seat 46. The light level must drop to 30 foot-candles before the valve 26 will open again and turn on the gas light in head 17.

Another important feature of this invention is that the areas of orifice openings 60 and 80 can be reduced in size by use of a bypass orifice 95 disposed between the gas inlet to enclosure 22 and passage means 48. Gas flow rate is reduced, and the energy required to move the restriction member 84 out of orifice opening 80 is also reduced. It follows, therefore, that a smaller and less costly solar battery or solar cell 23 can be used.

In practice, the pilot flame is actually the main gaslight flame turned down, as the gas lamp is fed separately from the gas flowing through pilot conduit 20. The bypass orifice 95 permits a small quantity of gas to flow directly to the gas lamp. The size of orifice 95 is such that the gas light remains in a pilot position regardless of flow from the pilot conduit 20. If desired, orifice 95 may be an adjustable needle valve to provide for individual gas lamp adjustment.

As an example of the improved performance of this invention, consider a gas control mechanism 12 operating with 0.010 inch diameter orifice openings 60 and 95. Orifice opening 80 was 0.015 inch in diameter. Earlier gas control mechanisms, such as that shown in my Patent No. 3,188,836, used a 0.018 inch orifice at the equivalent point 80. Since the forces involved are proportional to orifice area, a force reduction of about 30 percent is obtained in the example given. Former gas control mechanisms operated on a 5-cell solar battery, whereas only a 3-cell solar battery 23 is used in the gas control mechanism of this invention. Power required for control operation is reduced from 4 milliwatts to less than 2 milliwatts. The cost of the solar battery is therefore reduced. It will be understood that these figures of power reduction are for one embodiment of the present invention and that further reduction may be possible by use of smaller orifices 60 and 80. As will be apparent to those skilled in the art, the practical limits are fixed by constructional problems.

It is intended that the appended claim cover all such changes and modifications as fall within the true spirit and scope of the invention.

I claim:

Gas control mechanism for regulating the flow of gas to a gas light responsive to predetermined conditions of light comprising an enclosure having a gas inlet communicating with a source of gas, a gas outlet for communicating with the gas light and a pilot outlet for communicating with the gas light, valve means for controlling the flow of gas from said gas inlet to said gas outlet, pressure-responsive means operatively connected to said valve means and including a housing in said enclosure defining a first chamber communicating with the gas inlet and a second chamber communicating with the interior of the enclosure, a third chamber being defined in the enclosure, passage means having a pressure-reducing orifice for communicating said first chamber with the third chamber, galvanometer means in said third chamber, photoelectric means operatively connected with said galvanometer means for actuating same in response to predetermined light energy, a control lever in said third chamber mounted for movement with said galvanometer means and having a portion thereof disposed adjacent the pilot outlet for cooperating with the pilot outlet opening to vary the size of the pilot outlet opening, whereby, when the photoelectric means sense a first predetermined light condition, the control lever is moved to reduce the area of the pilot outlet opening, causing an increase of pressure in the third chamber and the second chamber to move the pressure-responsive means to open the valve means to permit gas flow between the gas inlet and the gas outlet, and when the photoelectric means sense a second predetermined light condition, the control lever is moved to increase the area of the pilot outlet opening, permitting the gas pressure in the second chamber to move the pressure-responsive means to close the valve means and terminate gas flow from the gas inlet to the gas outlet, and bypass passage means in the enclosure for communicating the gas inlet with the gas outlet even if the valve means is closed, said bypass passage means including a bypass orifice.

References Cited

UNITED STATES PATENTS 2,652,109    9/1953    Ray _____ 158—124
3,188,866    6/1965    Kniebes _____ 67—119

JAMES W. WESTHAVER, *Primary Examiner.*